(12) United States Patent
Halter

(10) Patent No.: US 6,179,060 B1
(45) Date of Patent: Jan. 30, 2001

(54) SOD-LAYING VEHICLE APPARATUS AND SOD-HOLDING DEVICE THEREFOR

(76) Inventor: Thomas E. Halter, 22920 Hanson Rd., Union Grove, WI (US) 53182

( * ) Notice: Under 35 U.S.C. 154(b), the term of this patent shall be extended for 0 days.

(21) Appl. No.: 09/318,484

(22) Filed: May 25, 1999

(51) Int. Cl.[7] .................................................. A01B 45/00
(52) U.S. Cl. ............................................. 172/19; 242/557
(58) Field of Search ........................ 172/19, 20; 242/557

(56) References Cited

U.S. PATENT DOCUMENTS

| | | |
|---|---|---|
| 3,982,711 | 9/1976 | Bradley et al. . |
| 4,754,815 | 7/1988 | Brouwer et al. . |
| 4,878,542 | 11/1989 | Brouwer et al. . |
| 4,890,801 | 1/1990 | Brouwer et al. . |
| 4,892,152 * | 1/1990 | Van Vuuren ........................... 172/20 |
| 5,307,880 | 5/1994 | Woerner . |
| 5,571,252 * | 11/1996 | Worrel et al. ........................ 172/20 |
| 5,626,195 * | 5/1997 | Dover .................................... 172/19 |
| 5,697,452 | 12/1997 | Link . |

OTHER PUBLICATIONS

Mobile Track Vehicles LLC—card—date unknown.
Woerner Manufacturing International—brochure—date unkown.
Woerner Manufacturing International—website sheets—3 pages—date unkown.
Brouwer Turf Equipment—brochure entitled "Large Roll Installers Models SPI 2430, Rollmate 2430, SLH 2430, SL 2400/SL 4800 & HPI," copyright 1998, printed in USA.

* cited by examiner

Primary Examiner—Christopher J. Novosad
(74) Attorney, Agent, or Firm—Jansson, Shupe, Bridge & Munger, Ltd.

(57) ABSTRACT

Sod-laying apparatus for mounting on a vehicle is disclosed. The apparatus includes a pair of support arms, each with a proximal end secured to the frame for pivoting arm movement in spaced parallel vertical fixed planes, a horizontal transverse guide member secured to the distal end of each of the support arms, loading members on each of the guide members movable along the axis of the sod roll on opposite sides thereof between roll-unloaded and roll-loaded positions, and roll-insertable members on each of the loading members. Preferred embodiments include the guide members as sleeves and the loading members as bars slidably therein; hydraulic cylinders actuating the loading members; and certain advantageous configurations, including of the loading and guide members with the preferred vehicle tracks.

20 Claims, 3 Drawing Sheets

SOD-LAYING VEHICLE APPARATUS AND SOD-HOLDING DEVICE THEREFOR

FIELD OF THE INVENTION

This invention is related to sod-laying equipment and, more particularly, to sod-laying vehicle apparatus including devices for pick-up and holding of sod rolls for dispensing (unrolling) of sod therefrom in sod-laying operations.

BACKGROUND OF THE INVENTION

Laying sod is a task which is time-consuming and labor-intensive. For major sod-laying projects, the sod is typically laid by dispensing sod from a sod roll held by a wheeled vehicle, i.e., by unrolling a supported sod roll as the vehicle traverses the ground area to be sodded.

Sod rolls are bulky, unwieldy things which are quite difficult to deal with in sod-laying operations. Furthermore, in most sod-laying jobs it is necessary to use a number of rolls, and this necessitates repeated loading and unloading of the sod-laying apparatus with one sod roll after another, making roll changeover a significant part of sod-laying operations.

Developments have been made in sod-laying equipment, including various roll-supporting sod-laying vehicles such as the "4818 Super Turf Installer" (or "WMI Installer") made by Woerner Manufacturing International of Elberta, Ala., the sod layers made by Mobile Track Vehicles of Berrien Springs, Mich., and the "SPI 2430" self-propelled sod layer made by Brouwer Turf Equipment of Dalton, Ohio. Devices such as these are intended for use by a single operator, operating either from a walk-behind position or from an operator's seat.

United States patents on sod-laying equipment include U.S. Pat. Nos. 5,307,880, 5,697,452, 4,890,801, 4,878,542, 4,754,815 and 3,982,711. The devices of the aforementioned commercial products and the devices disclosed in patents each have drawbacks or problems which heretofore have not been solved. U.S. Pat. No. 5,307,880 (Woerner) relates to the aforementioned commercial sod-laying vehicle apparatus of Woerner Manufacturing International with respect to which the instant invention is a particular improvement and advance. Such patent is referenced below because much of the vehicle disclosed therein provides the context for highly preferred embodiments of the instant invention.

Despite advances represented by the commercially-available equipment and patents, there has remained a need for significant innovative improvement in the field of sod-laying vehicle apparatus with devices for the roll pick-up and holding devices, without giving up the benefits of the advances achieved to date.

Certain prior art equipment, including the referenced Woerner Manufacturing International equipment, requires an insert bar or core or core-mounting tube and bar within the sod roll for pick-up and holding of the sod roll on the sod-laying apparatus. Significant operational disadvantages and problems exist for equipment requiring through-roll structures. Inefficiency is inherent in the need for the operator to leave his normal walk-behind or seated position and insert a through-roll structure through the sod roll or core before whatever pick-up steps are then taken. Job sites may become littered with core tubes, requiring collection and recycling. Furthermore, requiring through-roll structures for roll pick-up may rule out the use of coreless sod rolls.

Coreless sod rolls are available and some prior sod-laying equipment, such as the aforementioned Brouwer apparatus, picks up and holds sod rolls without the use of through-roll structures. However, such equipment has significant operational disadvantages and problems. While the arm-mounted long pointed cones of such Brouwer device engage the opposed ends of a sod roll along its axis for pick-up and support, the motions and roll-engaging actions of such arms and cones tend to significantly mess up and significantly damage the inner portions of the coiled sod of a sod roll. It has now been determined that this sod-roll damage and mounting difficulty is attributable to the lateral swinging nature of the cone-support arms, including the wide arcs through which such arms must swing about their lateral pivot points during insertion of the long pointed cones into opposed roll ends; i.e., the cones move in substantially off-axis directions and positions during insertion which can necessarily cause the aforementioned sod-roll damage. The lateral arm-swinging motion also can render the proper positioning of the vehicle for roll pick-up most difficult, once again contributing to improper roll mounting and sod-roll damage.

Still another problem with such Brouwer equipment arises due to the fact that it is a three-wheel vehicle, having a single rear ground-engaging wheel for steering and two tires positioned on an axis forward of the sod-roll axis; thus, such sod-laying vehicle has a very long overall front-to-rear dimension compared to other equipment. Such long dimension makes it very difficult to lay sod on smaller, tighter areas and on other than flat ground. Furthermore, on uneven ground the three-wheel arrangement has a tendency of tipping side to side or sliding sideways, making it difficult to accurately install a row of sod in alignment with, and without damaging, a previously-laid row.

In summary, there is a need for further innovation in sod-laying apparatus, and it is to solution of the aforementioned problems that this invention is directed.

OBJECTS OF THE INVENTION

It is an object of this invention to provide improved sod-laying apparatus which overcomes some of the problems and shortcomings of apparatus of the prior art.

Another object of this invention is to provide improved sod-laying apparatus which facilitates easy pick-up of coreless sod rolls.

Another object of this invention is to provide improved sod-laying apparatus which allows pick-up of sod-rolls without the need for the operator to leave his normal operator's position and without causing sod-roll damage.

Still another object of this invention is to provide improved sod-laying apparatus for damage-free pick-up of coreless sod rolls.

Yet another object of this invention is to provide improved sod-laying apparatus which firmly and accurately picks up and supports a coreless sod-roll without any through-roll structure.

Another object of this invention is to provide a sod-roll holding and dispensing device which can be used to retrofit and thereby improve certain equipment already in use by sod-laying operators.

Another object of this invention is to provide improved sod-laying apparatus which allows easy pick-up of coreless sod rolls and which facilitates sod-laying operations on non-flat surfaces.

These and other important objects will be apparent from the following descriptions and from the drawings.

SUMMARY OF THE INVENTION

This invention is an improvement in sod-laying apparatus of the type including a vehicle with a frame, ground engagers to support and move the vehicle and a sod-roll holding/ dispensing device secured on the frame, the improvement being in the holding/dispensing device for the sod roll. The invention involves both the holding-and-dispensing device itself and sod-laying equipment which includes such device, either as original equipment or by modification. This invention overcomes certain problems and disadvantages of the prior art, including those set forth above.

The sod-holding/dispensing device of this invention includes: a pair of support arms secured to the frame on the vehicle, each support arm having a distal end which is at substantially fixed horizontal spacing from the other distal end; a pair of opposed coaxial roll-insertable members, one each of the distal ends, for the purpose of engaging and sandwiching of the sod roll along the axis thereof; a guide member secured to at least one of the support arms at the distal end thereof, such guide member being substantially horizontal and transverse the support arm; and a loading member on the guide member for movement with respect thereto in a substantially horizontal axial direction (i.e., along the axis of a sod roll) between retracted and extended positions (i.e., between roll-unloaded and roll-loaded positions), such loading member having one of the roll-insertable members secured thereon.

In preferred embodiments, each of the support arms has a proximal end pivotably secured with respect to the frame for pivoting in spaced substantially parallel vertical fixed planes. This facilitates raising and lowering of the sod roll, while still keeping support-arm distal ends at the aforementioned substantially fixed horizontal spacing from one another. The fixed positions of the support-arm distal ends facilitates accurate sod-roll mounting by movement of the loading members and roll-insertable members, and allows quick and easy mounting without damaging the sod rolls and without the any use of a sod-roll mounting/winding bars.

In highly preferred embodiments, there are a pair of the guide members, one at each of the support-arm distal ends, and a pair of the loading members, one on each of the guide members and movable toward and away from one another, with each loading member having one of the roll-insertable members thereon.

The guide members preferably each include a straight elongate sleeve affixed to the corresponding support arm, with the corresponding loading member include a straight elongate bar slidably received within the sleeve and terminating in an engagement end, to which the corresponding roll-insertable member is secured.

In highly preferred embodiments, each of the roll-insertable members has a lead end and a trailing end, and a roll-engageable endplate is secured with respect to the corresponding roll-insertable member at the trailing end thereof. The endplate has a roll-engagement surface which extends radially about the roll-insertable member. In the most preferred embodiments, each of the roll-insertable members is a cone and the corresponding endplate is a circular disk coaxial and concentric with the cone.

In preferred embodiments, there is an actuator for each guide member and corresponding loading member. The actuator has opposite ends, one engaged to the guide member and the other engaged to the loading member, to provide the movement of the loading member vis-a-vis its corresponding guide member. The actuator is preferably an axially parallel hydraulic cylinder overlying the corresponding guide member, the guide member and loading member have connectors on them to which the opposite ends of the hydraulic cylinder are connected. The hydraulic cylinders are preferably double-acting cylinders, although single-acting spring-return hydraulic devices could be used instead.

The most preferred sod-laying apparatus of this invention include the described equipment for holding and dispensing sod on a vehicle on which the ground engagers are a pair of tracks. Such embodiments provide sod-laying apparatus with fairly short front-to-back overall dimensions, which facilitates sod-laying operations even on non-flat ground.

In highly preferred embodiments of the holding/ dispensing device, each support arms and corresponding guide member together form a rigid L-shaped structure. On a tracked vehicle, each of the support arms preferably extends above and along one of the tracks, with the corresponding guide member extending over the track. Certain embodiments of this invention include a horizontal ballast shelf which is affixed to and extends along the guide member. This facilitates placement of weights at appropriate positions as needed.

In certain embodiments of this invention, each of the support arms preferably includes a hollow tube portion of the support arm which is sleevable over and securable to a inner arm portion—typically a member which extends forwardly from the aforementioned frame. In such preferred embodiments, the hollow tube portions of the support arms are merely slipped onto the inner arm portions and then tightened in place by screw-down members or the like. This allows adjustment of the overall length of each support arm.

The improved sod-laying apparatus just described facilitates easy pick-up of coreless sod rolls. It allows pick-up of sod-rolls without the need for the operator to leave his normal walk-behind position or seat, and without causing sod-roll damage. It allows accurate pick-up and firm support of a coreless sod-roll without any through-roll structure. The sod-laying apparatus, when including a tracked vehicle, provides the recited advantages in equipment which facilitates sod-laying operations on non-flat surfaces. The sod-roll holding and dispensing device described above can be made as original equipment on new sod-laying vehicle apparatus, or can be used to retrofit and improve certain sod-laying equipment already being used by operators.

In addition to being useful for picking up coreless sod rolls, the equipment of this invention can be adapted for insertion into a roll of the type which has a tube core in it, and such insertion and pickup can be carried out without any need for the operator to leave his normal position behind the vehicle. More specifically, for such jobs the cones can easily be replaced with tube inserts of shorter axial dimension and of a radius such as to be readily receivable into the ends of a tube core.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
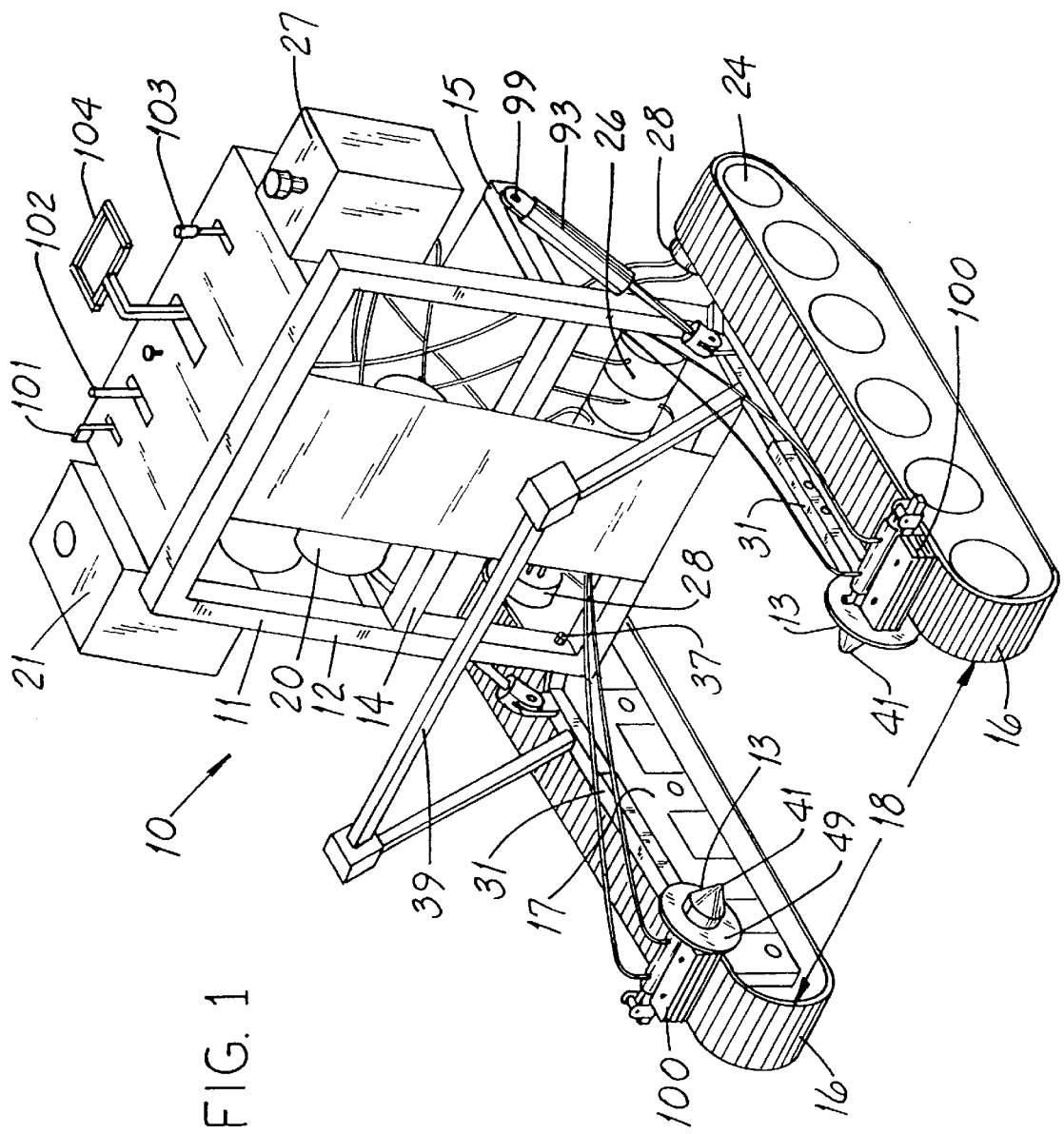
FIG. 1 is an overall perspective view of a preferred sod-laying apparatus of this invention.
Figure 2:
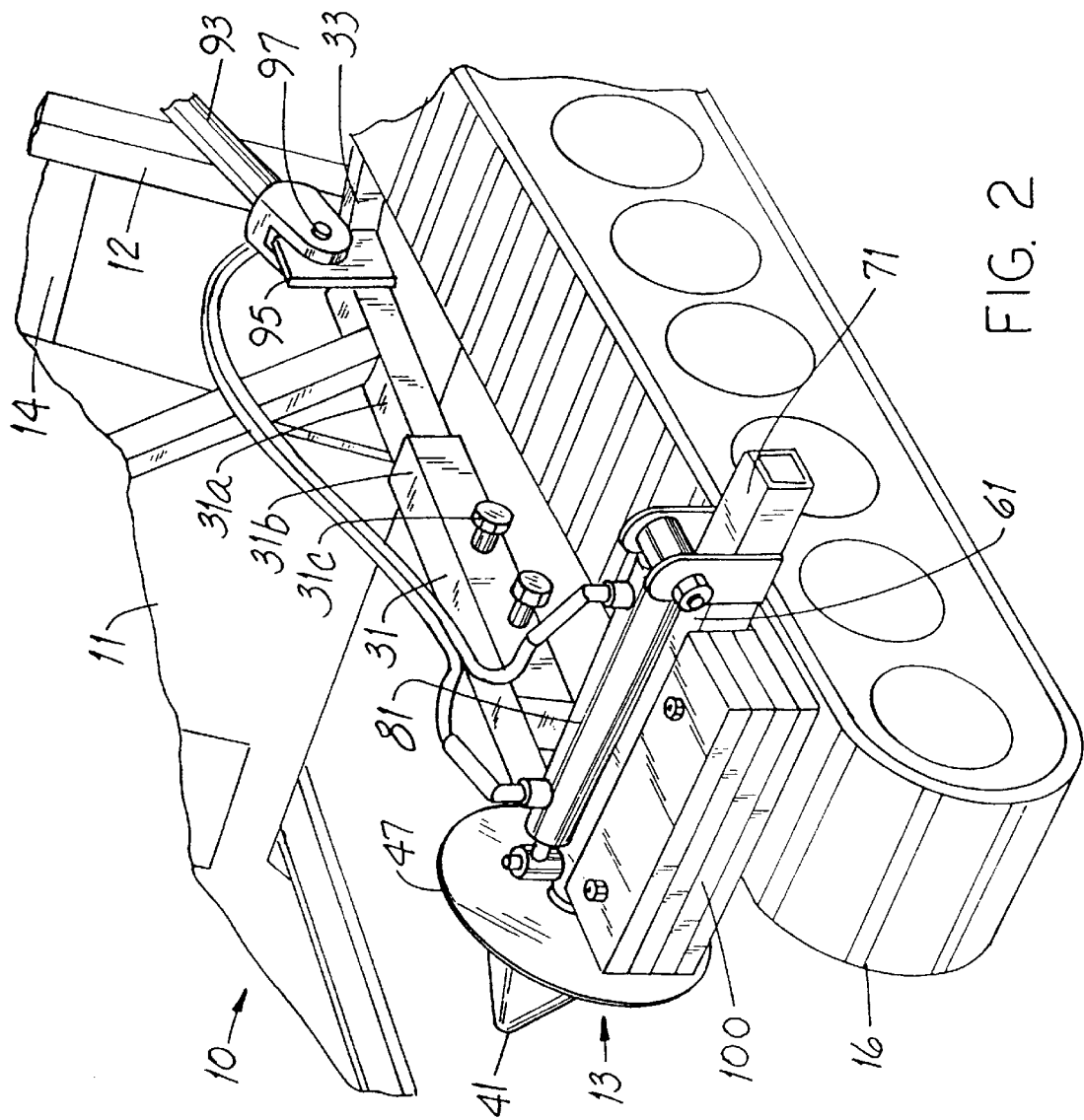
FIG. 2 is an enlarged fragmentary perspective view of FIG. 1, showing the elements of the inventive sod-roll holding/dispensing device.
Figure 3:
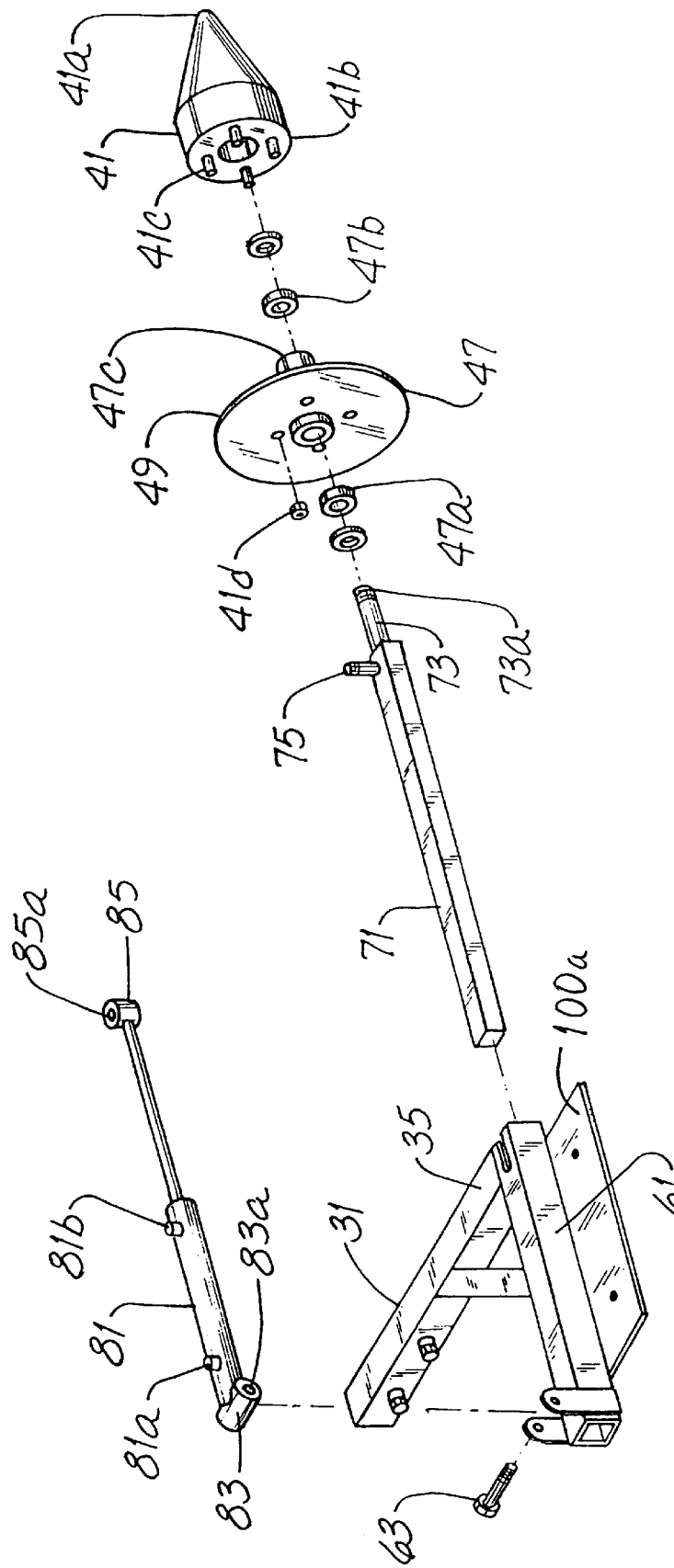
FIG. 3 is an exploded perspective view of the key elements of the sod-roll holding/dispensing device.

A sod-laying machine 10 in accordance with this invention is generally shown in FIG. 1. Sod-laying machine 10 includes a walk-behind vehicle 11 with an improved sod-holding/dispensing device 13 thereon.

Vehicle 11 has, among other things, a rigid rectangular frame 12 on which sod-holding/dispensing device 13 is secured, and a pair of continuous drive tracks 16. Frame 12 is reinforced by a horizontally-extending rigid brace member 14, and on either side includes rearwardly-extending horizontal members 15. All of the structural members are formed of hollowed steel tubing. Drive tracks 16 are rotatably deployed on a pair of track mounts 17 which are secured with respect to frame 12 on either side thereof. Drive tracks 16 define a clearance 18 therebetween large enough to accommodate a roll of sod, as discussed herein.

Drive tracks 16 are driven by a single combustion engine 20 secured to a rear portion of frame 12 in the position shown. Engine 20 drives three hydraulic pumps mounted in series; one of these pumps 26 is shown in FIG. 1. Two of the pumps are used to drive the tracks, and the third is used to power sod-roll loading and lifting operations. The hydraulic pumps for driving the tracks power separate hydraulic motors 28 which turn a pair of drive sprocket 24, one within a rear portion of each track 16. The two drive sprockets 24 are engaged and driven in forward or rearward directions to control the movement of vehicle 11 by operation of the corresponding continuous track(s) 16. FIG. 1 also shows an hydraulic fluid reservoir 27 and a fuel tank 21.

Engagement, driving and steering of the track apparatus are all by means of well known hydraulic drives, or may be by other well known mechanical linkages. One such arrangement is described in detail in aforementioned U.S. Pat. No. 5,307,880. Given that various mechanical and hydraulic linkages for these purposes are known, such information need not be given in detail here. It is noted, however, that hydraulic means provide drive and control arrangements which are particularly easy to operate.

Sod-roll holding/dispensing apparatus 13 includes a pair of forwardly-extending rigid support arms 31, each with a proximal end 33 and a distal end 35. Each support arm is pivotably secured at its proximal end 33 to frame 12 by a pivot mount 37. Each distal end 35 is at substantially fixed horizontal spacing from the distal end of the other support arm, and pivotable mount of support arms 31 is such that they pivot together only in spaced parallel vertical fixed planes. An inverted U-shaped yoke frame 39 interconnects support arms 31 at positions forward of pivot mounts 37 to further support the arms in their constant spaced positions.

Distal ends 35 have a pair of opposed coaxial roll-insertable cones 41 on them, one cone 41 on each distal end 35. Cones 41 are used for the purpose of engaging, sandwiching and thereby supporting a sod roll (not shown) along the axis thereof without use of any sod-roll mounting/winding insert bar to support the roll. Coreless sod rolls are conveniently engaged and supported in this manner—i.e., without any through member. Furthermore, sod rolls are engaged for purposes of pick-up without any lateral swinging (pivoting) of support arms 31, as hereafter described.

Each support arm 31 includes a forwardly-extending inner arm portion 31a, which is the portion of support arm 31 pivotably secured to frame 12, and a hollow tube portion 31b which is sleeved over and secured to inner arm portion 31a. Portions 31a and 31b are secured together by means of screw-down members 31c. This allows the lengths of support arms 31 to be adjusted to some limited extend.

Secured at each distal end 35 of each support arm 31 is a guide member 61 in the form of a straight elongate sleeve. Each guide member sleeve 61 is secured in a substantially horizontal orientation transverse its corresponding support arm 31, both guide member sleeves being coaxially aligned. In each sleeve 61 is a loading member 71 in the form of a straight elongate bar. Bars 71 are horizontal and coaxially aligned, i.e., along the axis of a sod roll on the device. Loading bars 71 have engagement portions 73 extending near their opposed ends, and loading bars 71 and their engagement portions terminate in engagement end 73a to which cones 41 are coaxially secured in opposed facing relationship. Loading bars 71 are axially movable back and forth on and with respect to guide members 61 between retracted and extended positions—i.e., between roll-unloaded and roll-loaded positions. In the roll-loaded positions, cones 41 substantially fully inserted into the ends of a sod roll along the axis thereof. After a roll is dispensed during the laying process, it is not necessary to remove and discard any insert bar or roll core member. Instead, loading bars 71 and the cones thereon can be moved to their retracted roll-unloaded position, to position them for engagement with and pick-up of another sod roll.

Each cone 41 has a lead end 41a and a trailing end 41b. A roll-engageable endplate 47 is secured concentrically with respect to each cone 41 at its trailing end 41b. Each endplate 47, which is a circular disk, has an annular roll-engagement surface 49 which extends radially about corresponding cone 41 in position to help in sandwiching the sod rolls to properly support them. The connections are more specifically described as follows: Each cone 41 has four threaded stubs 41c extending from its trailing end 41b, which extend through corresponding holes in corresponding endplate 47 for engagement with bolts 41d. Bearings 47a and 47b within endplate hub 47c facilitate the rotatable mounting of cones 41 and endplate 47 to engagement portion 73 of each loading bar 71.

Overlying each guide member sleeve 61 in an axially parallel orientation is a double-acting hydraulic cylinder device 81 which serves as an actuator for the corresponding loading member 71. Each cylinder device 81 has opposite first and second ends 83 and 85, respectively, one connected to guide sleeve 61 and the other to corresponding loading member bar 71. More specifically, hydraulic cylinder device 81 is secured to guide sleeve 61 by means of engagement of a connector bolt 63 on sleeve 61 with a bolt hole 83a at first end 83 of cylinder device 81, and secured to loading member bar 71 by means of engagement of a vertical post 75 on loading bar 71 with a post-connector hole 85a at second end 85 of cylinder device 81. Operation of double-acting hydraulic cylinder device 81 provides the aforementioned movement of loading member bar 71 vis-a-vis its corresponding guide member sleeve 61. Hydraulic feed lines are attached at attachment points 81a and 81b, and operate cylinder device 81 in well-known manner.

Each support arm 31 and corresponding guide sleeve 61 together form a rigid L-shaped structure. Each support arm 31 extends above and along one of tracks 16, and each guide sleeve 61 extends over one of tracks 16. A horizontal ballast shelf 100a is affixed to and extends each guide sleeve 61. Weights 100 are placed on ballast shelves 100a, and provide useful weight in appropriate positions.

Support arms 31 and the associated inverted U-shaped yoke member 39 pivot together about pivot mounts 37 on frame 12, to lift or lower the sod roll or to locate roll-insertable cones 41 at the right height for engagement with and pick-up of a sod roll. The pivot position of support arms 31 and yoke member 39 are determined by operation of hydraulic lift cylinders 93 on either side of frame 12. Tab members 95 project upwardly from the top of support arms 31 at a position near pivot mounts 37 of the support arms to the frame. Each lift cylinder 93 is secured at one end thereof to corresponding support arm 31 by a connector 97 which is engaged to corresponding tab member 95; each lift cylinder 93 is secured at its other end to one of rearwardly-extending horizontal members 28 of frame 12 by a connector 99, which is at a position well above the connection to corresponding support arm 31. Lift cylinders 93, which are also double-acting devices, have hydraulic feed lines attached thereto for operation in well-known manner.

In operation of the apparatus of this invention, the pick-up and use of sod rolls is particularly convenient and easy. Vehicle 11, with loading members 71 and cones 41 thereon in their retracted positions, is simply driven to a location such that cones 41 bracket a sod roll lying on the ground. Then, after the vertical position of lift cylinders 93 is adjusted such that cones 41 are substantially coaxial with the sod roll, loading members 71 are operated to cause cones 41 to move to their extended positions to first engage the roll along its axis and then be inserted into the ends of the roll. This continues until opposed endplates 47 engage and sandwich the sod roll, such that the sod roll is firmly supported on cones 41. Then, the sod roll is lifted to the desired extent by operation of lift cylinders 93, and the operator drives vehicle 11 to the appropriate location, where sod-laying commences or continues, in the normal manner. When the sod roll is depleted, the operator can proceed to pick up the next sod roll without moving from the vehicle operator's position.

FIG. 1 illustrates the various controls used in operating sod-laying machine 10. These include an engine throttle 101, an hydraulic lift control 102, a control 103 to operate loading members 71 and cones 41 thereon, and a T-bar control 104 for vehicle movement itself. T-bar control 104 can be moved forward, backward and from side to side to give forward, backward and turning movement of the vehicle. A wide variety of other control arrangements are possible.

The parts of sod-laying apparatus 10 may be made from stock and materials which are widely available and commonly used for machines. Appropriate choices are well known to those skilled in the art who become acquainted with this invention.

While vehicle 11 illustrated in the drawings is a walk-behind vehicle, the invention is just a readily included on a riding vehicle, such as one having a rear seat or a rear platform on the operator stands.

While the principles of this invention have been described in connection with specific embodiments, it should be understood clearly that these descriptions are made only by way of example and are not intended to limit the scope of the invention.

What is claimed is:

1. In sod-laying apparatus including a vehicle with a frame and ground engagers to support and move the vehicle and a sod-holding device on the frame for a sod roll which defines an axis, the improvement wherein the sod-holding device comprises:
    a pair of support arms secured to the frame, each support arm having a distal end, the distal ends being at substantially fixed horizontal spacing from one another;
    a pair of opposed coaxial roll-insertable members, each on one of the distal ends, for sandwiching support of the sod roll by direct sod contact within and at the end of the roll;
    a substantially horizontal transverse guide member secured at the distal end of at least one of the support arms; and
    a loading member on the guide member for movement with respect thereto in a substantially horizontal axial direction between retracted roll-unloaded and extended roll-loaded positions, the loading member having one of the roll-insertable members secured thereon.

2. The sod-laying apparatus of claim 1 wherein each of the support arms has a proximal end pivotably secured with respect to the frame for pivoting in spaced substantially parallel vertical fixed planes.

3. The sod-laying apparatus of claim 1 comprising:
    a pair of the guide members, one at each of the support-arm distal ends; and
    a pair of the loading members, one on each of the guide members and movable toward and away from one another, each loading member having one of the roll-insertable members thereon.

4. The sod-laying apparatus of claim 3 wherein:
    the guide members each include a straight elongate sleeve affixed to the corresponding support arm;
    the loading members each include a straight elongate bar slidably received within the sleeve and terminating in an engagement end to which the corresponding roll-insertable member is secured.

5. The sod-laying apparatus of claim 4 comprising, for each guide member and loading member, an actuator having opposite ends, one engaged to the guide member and the other engaged to the loading member, to provide loading-member movement.

6. The sod-laying apparatus of claim 5 wherein:
    the actuator is an axially parallel hydraulic cylinder overlying the corresponding guide member; and
    the guide member and the loading member have connectors thereon to which the opposite ends of the hydraulic cylinder are connected.

7. The sod-laying apparatus of claim 1 wherein:
    the ground engagers of the vehicle are a pair of tracks;
    each of the support arms and the corresponding guide member together form a rigid L-shaped structure, the support arm extending above and along one of the tracks and the guide member extending over said track.

8. The sod-laying apparatus of claim 7 comprising a horizontal ballast shelf affixed to and extending along the guide member.

9. In sod-laying apparatus including a vehicle with a frame and ground engagers to support and move the vehicle and a sod-holding device on the frame for a sod roll which defines an axis, the improvement wherein the sod-holding device comprises:
    a pair of support arms secured to the frame, each support arm having a distal end, the distal ends being at substantially fixed horizontal spacing from one another;
    a pair of opposed coaxial roll-insertable members, each on one of the distal ends, for sandwiching support of the sod roll, each of the roll-insertable members having a lead end and a trailing end, a roll-engageable end plate being secured with respect to each of the roll-insertable members at the trailing end thereof, the end plate having a roll-engagement surface extending radially about the roll-insertable member;
    a substantially horizontal transverse guide member secured at the distal end of at least one of the support arms; and a loading member on the guide member for movement with respect thereto in a substantially horizontal axial direction between retracted roll-unloaded and extended roll-loaded positions, the loading member having one of the roll-insertable members secured thereon.

10. The sod-laying apparatus of claim 9 wherein:

each of the roll-insertable members is a cone; and each of the endplates is a circular disk coaxial and concentric with one of the cones.

11. Sod-holding and dispensing apparatus for mounting on the frame of a vehicle used for laying sod from a sod roll which defines an axis, comprising:

a pair of frame-mountable support arms each having a proximal end and a distal end, the support arms when mounted having the distal ends at substantially fixed horizontal spacing from one another;

a pair of substantially horizontal transverse guide members, one secured at the distal end of each of the support arms;

a pair of loading members, one on each of the guide members for movement with respect thereto in a substantially horizontal axial direction between retracted roll-unloaded and extended roll-loaded positions; and a pair of roll-insertable members, one secured to each of the loading members, the roll-insertable members being in opposed coaxial arrangement when mounted and being disposed for direct sod contact within and at the ends of the roll.

12. The sod-laying apparatus of claim 11 wherein:

the guide members each include a straight elongate sleeve affixed to the corresponding support arm; and the loading members each include a straight elongate bar slidably received within the corresponding sleeve and terminating in an engagement end to which the corresponding roll-insertable member is secured.

13. The sod-laying apparatus of claim 12 comprising, for each guide member and loading member, an actuator having opposite ends, one engaged to the guide member and the other engaged to the loading member, to provide the movement of the loading member.

14. The sod-laying apparatus of claim 13 wherein:

the actuator is an axially parallel hydraulic cylinder overlying the corresponding guide member; and the guide member and corresponding loading member each have connectors thereon to which the opposite ends of the corresponding hydraulic cylinder are connected.

15. The sod-laying apparatus of claim 11 wherein each of the support arms and the corresponding guide member together form a rigid L-shaped structure.

16. The sod-laying apparatus of claim 15 comprising a horizontal ballast shelf affixed to and extending along each of the guide members.

17. The sod-laying apparatus of claim 16 wherein the roll-insertable member is a cone.

18. Sod-holding and dispensing apparatus for mounting on the frame of a vehicle used for laying sod from a sod roll which defines an axis, comprising:

a pair of frame-mountable support arms each having a proximal end and a distal end, the support arms when mounted having the distal ends at substantially fixed horizontal spacing from one another, each of the support arms having a hollow tube portion sleevable over and securable to an inner arm portion;

a pair of substantially horizontal transverse guide members, one secured at the distal end of each of the support arms;

a pair of loading members, one on each of the guide members for movement with respect thereto in a substantially horizontal axial direction between retracted roll-unloaded and extended roll-loaded positions; and a pair of roll-insertable members, one secured to each of the loading members, the roll-insertable members being in opposed coaxial arrangement when mounted.

19. Sod-holding and dispensing apparatus for mounting on the frame of a vehicle used for laying sod from a sod roll which defines an axis, comprising:

a pair of frame-mountable support arms each having a proximal end and a distal end, the support arms when mounted having the distal ends at substantially fixed horizontal spacing from one another;

a pair of substantially horizontal transverse guide members, one secured at the distal end of each of the support arms;

a pair of loading members, one on each of the guide members for movement with respect thereto in a substantially horizontal axial direction between retracted roll-unloaded and extended roll-loaded positions; and a pair of roll-insertable members, one secured to each of the loading members, the roll-insertable members being in opposed coaxial arrangement when mounted, each of the roll-insertable members having a lead end and a trailing end, a roll-engageable end plate being secured with respect to each of the roll-insertable members at the trailing end thereof, the end plate having a roll-engagement surface extending radially about the roll-insertable member.

20. The sod-laying apparatus of claim 19 wherein:

each of the roll-insertable members is a cone; and each of the endplates is a circular disk coaxial and concentric with one of the cones.

* * * * *